United States Patent
Lee

(10) Patent No.: US 8,971,033 B2
(45) Date of Patent: Mar. 3, 2015

(54) CLAMSHELL DEVICE WITH ANTI-WOBBLE HOLDING MECHANISM

(71) Applicant: Hewlett-Packard Development Company, L.P., Houston, TX (US)

(72) Inventor: Chien-Kuo Lee, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

(21) Appl. No.: 13/756,503

(22) Filed: Jan. 31, 2013

(65) Prior Publication Data

US 2014/0211400 A1     Jul. 31, 2014

(51) Int. Cl.
*G06F 1/16*     (2006.01)
*H05K 5/02*     (2006.01)

(52) U.S. Cl.
CPC ............ *G06F 1/1616* (2013.01); *G06F 1/1679* (2013.01)
USPC ................. 361/679.27; 361/807; 361/679.26; 361/679.55

(58) Field of Classification Search
USPC .......... 16/221–392; 361/755, 679.27, 679.09, 361/679.06, 679.55, 679.01, 679.07, 600; 455/575.1–575.4
See application file for complete search history.

(56) References Cited

U.S. PATENT DOCUMENTS

| | | | |
|---|---|---|---|
| 4,759,099 A * | 7/1988 | Morano et al. ..................... 16/64 |
| 5,103,376 A * | 4/1992 | Blonder ................... 361/679.09 |
| 5,900,848 A * | 5/1999 | Haneda et al. ................. 345/1.1 |
| 6,532,147 B1 * | 3/2003 | Christ, Jr. ................. 361/679.27 |
| 6,727,894 B1 | 4/2004 | Karidis et al. |
| 6,826,043 B2 * | 11/2004 | Chang ....................... 361/679.27 |
| 8,380,262 B2 * | 2/2013 | Liu et al. .................... 455/575.4 |
| 8,773,353 B2 * | 7/2014 | Wei ................................ 345/156 |
| 2005/0174724 A1 * | 8/2005 | Chen ............................. 361/681 |
| 2005/0264983 A1 * | 12/2005 | Chen ............................. 361/681 |
| 2006/0256512 A1 * | 11/2006 | Esther Kang ................. 361/681 |
| 2011/0023272 A1 * | 2/2011 | Huang ............................. 16/362 |
| 2011/0038108 A1 * | 2/2011 | Chang et al. ............. 361/679.01 |
| 2011/0286170 A1 * | 11/2011 | Liu ............................. 361/679.4 |
| 2011/0312392 A1 * | 12/2011 | Reeves et al. .............. 455/575.3 |
| 2012/0035906 A1 * | 2/2012 | Jephcott ........................... 704/2 |
| 2014/0001941 A1 * | 1/2014 | Liang et al. ................... 312/327 |

OTHER PUBLICATIONS

"Lenovo IdeaPad Yoga Review", < http://laptop-accessories.typepad.com/blog/laptops/ >, Retrieved Jan. 8, 2013.
"Rackmount DVI USB + PS/2 KVM Drawer", < http://www.nti1.ae/kvm-drawer-dvi.html >, Retrieved on Jan. 8, 2013.
Shin; "HP Pavilion HDX User Review", < http://www.notebookreview.com/default.asp?newsID=4041 >, Oct. 24, 2007.

(Continued)

*Primary Examiner* — Robert J Hoffberg
*Assistant Examiner* — Michael Matey
(74) *Attorney, Agent, or Firm* — Hewlett-Packard Patent Department

(57) ABSTRACT

A clamshell device comprises a base module, a cover module, a center hinge for hinging the cover module to the base module, and a holding mechanism. The holding mechanism is coupled between corresponding sides of the base module and the cover module such that when the cover module is at an open angle pivotally away from the base module, the cover module is capable of being steadily held at the open angle.

20 Claims, 2 Drawing Sheets

(56) References Cited

OTHER PUBLICATIONS

Webster, C.; "Asus Eee Pad Slider SL101 Review", < http://www.bit-tech.net/hardware/mobile/2011/10/26/asus-eee-pad-slider-sl101-review/1 > Oct. 26, 2011.

Worthen; "Windows 8 Success Hinges on $10 Component", < http://online.wsj.com/article/SB10001424052970204005004578080621686676956.html >, Oct. 25, 2012.

* cited by examiner

CLAMSHELL DEVICE WITH ANTI-WOBBLE HOLDING MECHANISM

BACKGROUND

Generally, a clamshell device comprises two assemblies hinged with each other, wherein one assembly is often known as cover module, and the other assembly is often known as base module. In prior art clamshell devices, the cover module may not be very steadily held at the open angle when the cover module is at an open angle with respect to the base module. For example, a common clamshell device may be a clamshell notebook computer, and where the cover module is at an open angle, if its cover module (i.e., LCD module) is slightly touched or contacted by a finger, substantial wobble may occur to the cover module. However, such wobble is generally undesired.

DETAILED DESCRIPTION

An object of the present disclosure is to improve wobble of the cover module of the clamshell device, so as to allow applying a decreased size of hinge to articulate the cover module and the base module of the clamshell device without substantial wobble when the cover module is slightly touched or contacted.

Figure 1:
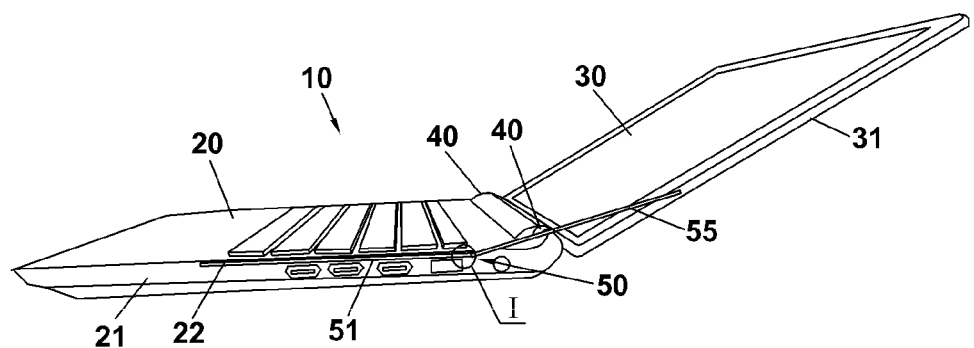
FIG. 1 is a schematic perspective view of a clamshell device with a cover module at a maximum open angle with respect to a base module according to an example embodiment.
Figure 2:
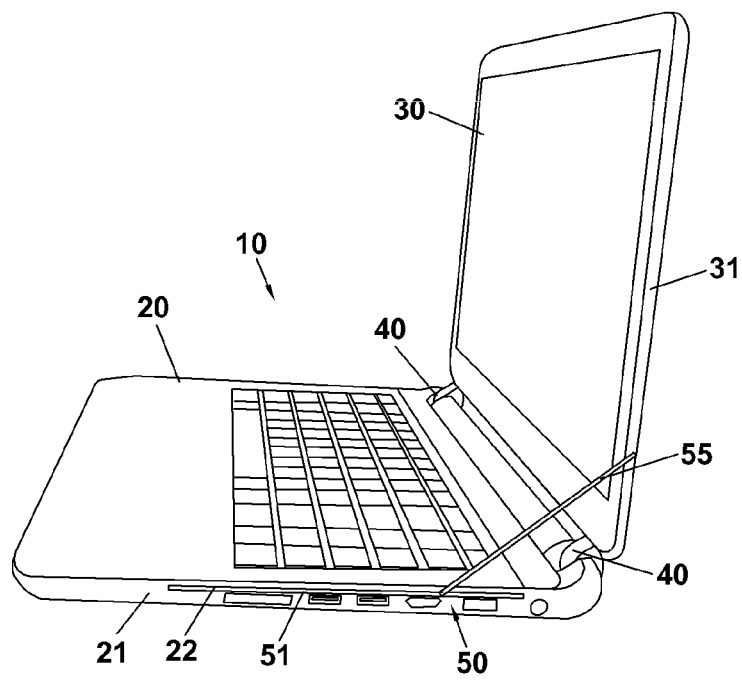
FIG. 2 is a schematic perspective view of a clamshell device with a cover module at an open angle of 90 degrees with respect to a base module according to an example embodiment.
Figure 3:
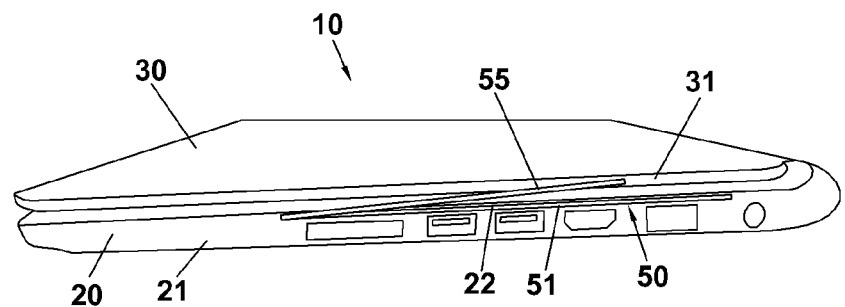
FIG. 3 is a schematic perspective view of a clamshell device with a cover module at a closed state with respect to a base module according to an example embodiment.

FIGS. 1-3 are schematic perspective views of a clamshell device 10 according to an example embodiment. In the example illustrated, the clamshell device 10 is shown as a clamshell notebook computer, wherein the cover module 30 is a LCD module of the clamshell notebook computer. In some examples, the LCD module may comprise a touch screen.

As shown in FIGS. 1-3, the cover module 30 of the clamshell device 10 is hinged to the base module 20 of clamshell device 10 by one or more center hinges 40, so that the cover module 30 can be pivoted onto the base module 20 to close clamshell device 10, and can be pivoted away from the base module 20 to open the clamshell device 10. For example, in FIGS. 1-3, the cover module 30 of the clamshell device 10 is shown as being at a maximum open angle (such as 120 degrees or more), at an open angle of 90 degrees, and at the closed state with respect to the base module 20, respectively.

In the example illustrated, the clamshell device 10 is provided with a holding mechanism 50. The holding mechanism 50 is coupled between corresponding sides 21, 31 of the base module 20 and cover module 30, so that the cover module 30 can be steadily held at the open angle when the cover module 30 is at an open angle pivotally away from the base module 20, so as to decrease or inhibit wobble of the cover module 30 when it is slightly touched or contacted.

Figure 4:
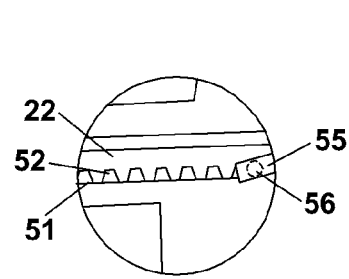
FIG. 4 is a schematic partially enlarged view of Area I of FIG. 1 according to an example embodiment.

In some examples, the holding mechanism 50 may comprise a click structure. The click structure may comprise a ratchet-bar 51 and a connecting-rod 55 as a drop pawl. Each of the ratchet-bar 51 and the connecting-rod 55 may be formed as a rigid one-piece member, As shown in FIG. 4, the connecting-rod 55 has a first end shown as having a pivot hole 57 and a second end shown as having a slide pin 56 for slidably engaging with the ratchet-bar 51. Alternatively, the first end of the connecting-rod 55 may be formed to have a pivot pin rather than a pivot hole.

Figure 5:
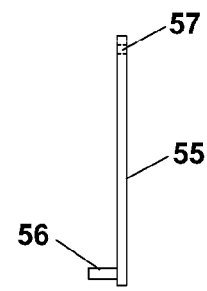
FIG. 5 is a schematic side view of a connecting-rod of a holding mechanism of a clamshell device according to an example embodiment.

As shown in FIG. 5, the teeth 52 of the ratchet-bar 51 are shown as trapezoid shapes. However, in some alternative examples, the teeth 52 may be formed as triangle, rectangle or other suitable shapes.

In the example illustrated, the ratchet-bar 51 may be provided at the base module 20, and the connecting-rod 55 may be pivotably connected to the cover module 30 via the pivot hole or pivot pin at its first end and may slidably engaging with the ratchet-bar 51 by the slide pin 56 at its second end. in some alternative examples, the ratchet-bar 51 may be also provided at the cover module 30, and the connecting-rod 55 may be pivotably connected to the base module 20 and also slidably engaging with the ratchet-bar 51 by the slide pin 56 at its second end.

In the example illustrated, the ratchet-bar 51 may be provided at a side-wall recess 22 of the base module 20. In such a case, the slide pin 56 of the connecting-rod 55 protrudes laterally inward into the side-wall recess 22 so as to slidably engage with the ratchet-bar 51.

The distance between the tooth-roots of any two adjacent teeth 52 if the ratchet-bar 51 is such that the slide pin 56 can slidably engage with the two adjacent teeth 52. Further, the distance between the tooth-top of the ratchet-bar 51 and the upper inner surface of the side-wall recess 22 of the base module 20 is greater than the diameter of the slide pin 56 of the connecting-rod 55. In such examples where the teeth 52 of the ratchet-bar 51 are formed as trapezoid, triangle and other suitable shapes with inclined side surfaces, a sufficient force can be applied to the cover module 30 to pivot it, without necessarily raising manually the second end of the connecting-rod 55. in such examples where the teeth 52 of the ratchet-bar 51 are formed as rectangle or other suitable shapes with vertical side surfaces, for pivoting the cover module 30, the second end of the connecting-rod 55 is firstly raised manually to disengage the slide pin 56 from the adjacent teeth of the ratchet-bar 51 to enable the pivot of the cover module 30.

What is claimed is:

1. A clamshell device, comprising:
    a base module;
    a cover module;
    a center hinge for hinging the cover module to the base module; and
    a holding mechanism comprising a click structure having a ratchet-bar with teeth, the holding mechanism coupled between corresponding sides of the base module and the cover module such that the cover module is capable of being steadily held at the open angle using the teeth when the cover module is at an open angle pivotally away from the base module, wherein the rachet-bar is provided at one of the base module and the cover module and wherein the click structure comprises a connecting-rod which is pivotably connected to the other one of the base module and the cover module at its first end and is provided with a slide pin at its second end, the slide pin slidably engaging with the ratchet-bar, wherein a distance between tooth-roots of two adjacent teeth of the ratchet-bar is such that the slide pin is capable of slidably engaging with the two adjacent teeth.

2. The clamshell device of claim 1, wherein:
the ratchet-bar is provided at the base module; and
the connecting-rod is pivotably connected to the cover module at its first end.

3. The clamshell device of claim 1, wherein:
each tooth of the teeth of the ratchet-bar are formed as one of a trapezoid, a rectangle, or a triangle.

4. The clamshell device of claim 1, wherein:
a distance between a tooth-top of the ratchet-bar and an upper inner surface of a side-wall recess of the base module is greater than a diameter of the slide pin of the connecting-rod.

5. The clamshell device of claim 1, wherein each of the ratchet-bar and the connecting-rod is a rigid one-piece member.

6. The clamshell device of claim 1, wherein the clamshell device is a clamshell notebook computer, and the cover module of the clamshell device is a LCD module of the clamshell notebook computer.

7. The clamshell device of claim 2, wherein:
the ratchet-bar is provided within a side-wall recess of the base module, and the slide pin protrudes laterally inward into the side-wall recess so as to slidably engage with the ratchet-bar.

8. A clamshell device, comprising:
a base module;
a cover module;
a center hinge for hinging the cover module to the base module; and
a holding mechanism comprising a click structure having a ratchet-bar with teeth, the holding mechanism coupled between corresponding sides of the base module and the cover module such that the cover module is capable of being steadily held at the open angle using the teeth when the cover module is at an open angle pivotally away from the base module, wherein the rachet-bar is provided at one of the base module and the cover module and wherein the click structure comprises a connecting-rod which is pivotably connected to the other one of the base module and the cover module at its first end and is provided with a slide pin at its second end, the slide pin slidably engaging with the ratchet-bar, wherein a distance between a tooth-top of the ratchet-bar and an upper inner surface of a side-wall recess of the base module is greater than a diameter of the slide pin of the connecting-rod.

9. The clamshell device of claim 8, wherein:
the ratchet-bar is provided at the base module; and
the connecting-rod is pivotably connected to the cover module at its first end.

10. The clamshell device of claim 8, wherein each tooth of the teeth of the ratchet-bar are formed as one of a trapezoid, a rectangle, or a triangle.

11. The clamshell device of claim 8, wherein a distance between tooth-roots of two adjacent teeth of the ratchet-bar is such that the slide pin is capable of slidably engaging with the two adjacent teeth.

12. The clamshell device of claim 8, wherein each of the ratchet-bar and the connecting-rod is a rigid one-piece member.

13. The clamshell device of claim 8, wherein the clamshell device is a clamshell notebook computer, and the cover module of the clamshell device is a LCD module of the clamshell notebook computer.

14. The clamshell device of claim 9, wherein:
the ratchet-bar is provided within a side-wall recess of the base module, and the slide pin protrudes laterally inward into the side-wall recess so as to slidably engage with the ratchet-bar.

15. A clamshell device, comprising:
a base module;
a cover module;
a center hinge for hinging the cover module to the base module; and
a holding mechanism comprising a click structure having a ratchet-bar with teeth, the holding mechanism coupled between corresponding sides of the base module and the cover module such that the cover module is capable of being steadily held at the open angle using the teeth when the cover module is at an open angle pivotally away from the base module, wherein the rachet-bar is provided at one of the base module and the cover module and wherein the click structure comprises a connecting-rod which is pivotably connected to the other one of the base module and the cover module at its first end and is provided with a slide pin at its second end, the slide pin slidably engaging with the ratchet-bar,
wherein the ratchet-bar is provided within a side-wall recess of the base module, the connecting-rod is pivotably connected to the cover module at its first end, and the slide pin protrudes laterally inward into the side-wall recess so as to slidably engage with the ratchet-bar.

16. The clamshell device of claim 15, wherein each tooth of the teeth of the ratchet-bar are formed as one of a trapezoid, a rectangle, or a triangle.

17. The clamshell device of claim 15, wherein a distance between tooth-roots of two adjacent teeth of the ratchet-bar is such that the slide pin is capable of slidably engaging with the two adjacent teeth.

18. The clamshell device of claim 15, wherein a distance between a tooth-top of the ratchet-bar and an upper inner surface of a side-wall recess of the base module is greater than a diameter of the slide pin of the connecting-rod.

19. The clamshell device of claim 15, wherein each of the ratchet-bar and the connecting-rod is a rigid one-piece member.

20. The clamshell device of claim 15, wherein the clamshell device is a clamshell notebook computer, and the cover module of the clamshell device is a LCD module of the clamshell notebook computer.

* * * * *

UNITED STATES PATENT AND TRADEMARK OFFICE
CERTIFICATE OF CORRECTION

| | |
|---|---|
| PATENT NO. | : 8,971,033 B2 |
| APPLICATION NO. | : 13/756503 |
| DATED | : March 3, 2015 |
| INVENTOR(S) | : Chien-Kuo Lee |

It is certified that error appears in the above-identified patent and that said Letters Patent is hereby corrected as shown below:

In the Claims

In column 2, line 62, in Claim 1, delete "rachet" and insert -- ratchet --, therefor.

In column 3, line 42 approx., in Claim 8, delete "rachet" and insert -- ratchet --, therefor.

In column 4, line 27 approx., in Claim 15, delete "rachet" and insert -- ratchet --, therefor.

Signed and Sealed this
Fourteenth Day of July, 2015

Michelle K. Lee
*Director of the United States Patent and Trademark Office*